(12) United States Patent
Pavoni

(10) Patent No.: US 10,343,597 B2
(45) Date of Patent: Jul. 9, 2019

(54) BRAKING SIGNALLING SYSTEM FOR BICYCLES, MOTORCYCLES AND CARS, EQUIPPED WITH HYDRAULIC BRAKING

(71) Applicant: Francesco Pavoni, Marino (IT)

(72) Inventor: Francesco Pavoni, Marino (IT)

(*) Notice: Subject to any disclaimer, the term of this patent is extended or adjusted under 35 U.S.C. 154(b) by 0 days.

(21) Appl. No.: 15/531,427

(22) PCT Filed: Nov. 26, 2015

(86) PCT No.: PCT/IT2015/000287
§ 371 (c)(1),
(2) Date: May 27, 2017

(87) PCT Pub. No.: WO2016/088148
PCT Pub. Date: Jun. 9, 2016

(65) Prior Publication Data
US 2018/0304803 A1    Oct. 25, 2018

(30) Foreign Application Priority Data
Dec. 2, 2014  (IT) .............................. RM2014A0698

(51) Int. Cl.
*B60Q 1/44* (2006.01)
*B62J 6/04* (2006.01)
*B62K 23/06* (2006.01)
*B62J 6/00* (2006.01)
*B62J 99/00* (2009.01)

(52) U.S. Cl.
CPC ............... *B60Q 1/444* (2013.01); *B62J 6/04* (2013.01); *B62K 23/06* (2013.01); *B60Q 2900/10* (2013.01); *B60Q 2900/30* (2013.01); *B62J 2006/008* (2013.01); *B62J 2099/002* (2013.01)

(58) Field of Classification Search
CPC ..................................................... B60Q 1/444
See application file for complete search history.

(56) References Cited

U.S. PATENT DOCUMENTS

| | | | | |
|---|---|---|---|---|
| 2007/0241874 | A1* | 10/2007 | Okpysh .................. | B60Q 1/444 340/479 |
| 2008/0297338 | A1* | 12/2008 | Singh ..................... | B60Q 1/441 340/479 |
| 2010/0263452 | A1* | 10/2010 | Burghardt ............. | G01L 9/0055 73/724 |
| 2013/0333994 | A1* | 12/2013 | Jordan ..................... | B62L 3/02 188/344 |

* cited by examiner

*Primary Examiner* — Hongmin Fan
(74) *Attorney, Agent, or Firm* — Patshegen IP LLC; Moshe Pinchas

(57) ABSTRACT

The present invention relates to a bicycle equipped with a hydraulic brake system and a braking signalling system. The braking signalling system includes detection equipment (2; 3; 4), which include the first radio communication equipment (19) based on Bluetooth Low Energy and a pressure sensor (21) coupled to the hydraulic braking system to detect any pressure changes in the hydraulic braking system. In addition, this brake signalling system also includes a beacon (6) designed to emit a light signal in response to any pressure change detected by the pressure sensor (21).

4 Claims, 4 Drawing Sheets

4

6

BRAKING SIGNALLING SYSTEM FOR BICYCLES, MOTORCYCLES AND CARS, EQUIPPED WITH HYDRAULIC BRAKING

Description of the industrial invention named "Braking Signalling System for bicycles, motorcycles and cars" which hereinafter will be referred to as "SSF". Bicycles currently on the market are not equipped with a braking or slowing down warning system, even though they have no restricted access to urban and extra-urban routes and are subject to the road traffic rules as well as the highway code. This lack of indicators is often cause of accidents, and can seriously endanger not only the life of the driver but also of the people or the vehicles following it.

Figure 1:
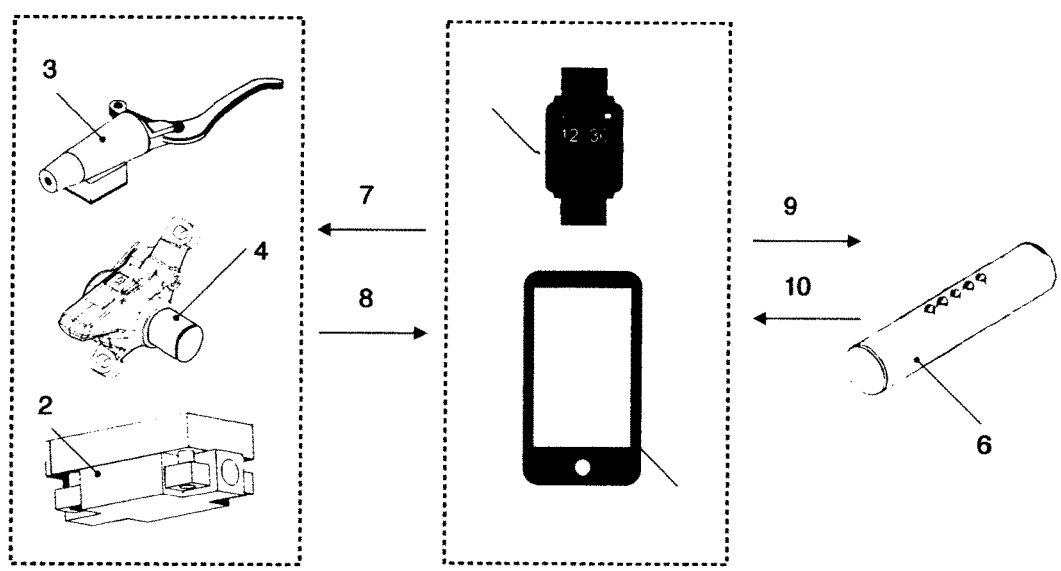

This invention's purpose is to eliminate this problem through the installation of the SSF—which is the object of the present invention—on bicycles already in use as well as on the newly manufactured ones, equipped with hydraulic braking system. The SSF detects any pressure change within the hydraulic circuit in brake cables, or in handlebar control grip (closed system and open system), or in the caliper. The pressure change detection in the circuit occurs by means of a pressure sensor connected to a Bluetooth hardware, powered with Li-ion rechargeable batteries. It then sends the information to: A) external devices such as cutting-edge smartphones or other Bluetooth hardware-equipped devices that, via a specifically developed software, will receive the information concerning the change of pressure within the braking system and forward it to the appropriate beacon (stop), equipped, in turn, with Bluetooth hardware and Li-ion rechargeable batteries. FIG. 1 shows the SSF operation diagram in the case of the use of external devices 1, such as smartphones or others equipped with Bluetooth low energy hardware. The system needs to be equipped with a device 2 (or box) to be installed on any point of the fluid-conveying pipe between the control handlebar grip and caliper, or the control handlebar grip device 3, or the caliper device 4 and always with the beacon device 6. All the devices 2, 3, 4, and 6 must be equipped with Bluetooth low energy single mode hardware with the relevant software installed. On devices 1 the especially developed software application installation and use is required, which hereinafter will be referred to as 'App'. On the first launch of the device 1 App, you need to register the device 2 or 3 or 4 and 6. These devices are equipped with an identification code that allows them to communicate with the device 1 as well as to transmit their services and features. Any pressure variation in the braking system is communicated to the device 1 through the data exchange with the device 2 or 3 or 4 in steps 7 and 8. The device 1 communicates with the device 6 determining the beacon turning on/off in steps 9 and 10.

Figure 2:
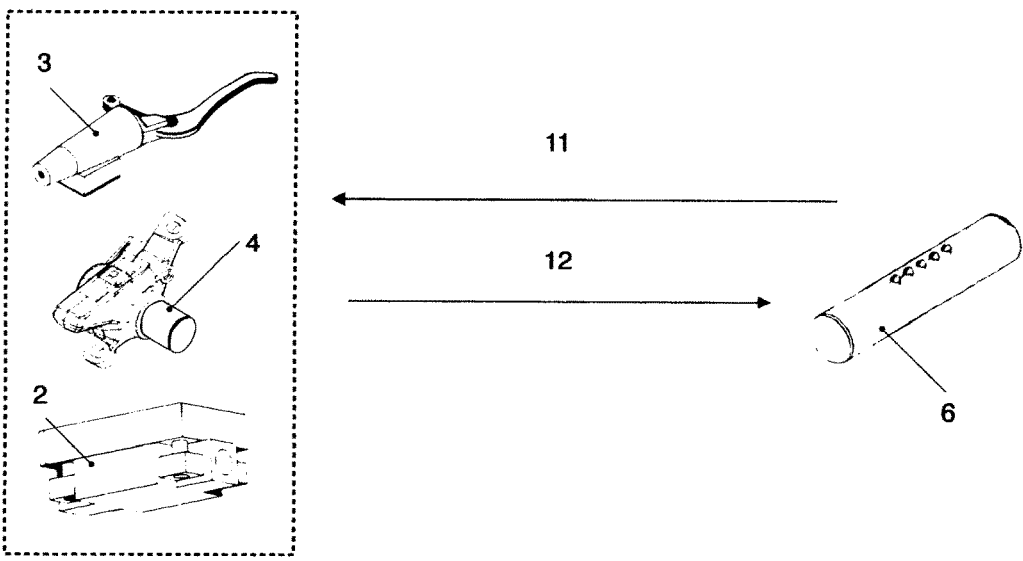

FIG. 2 shows the SSF operation diagram with no external devices 1 and with the direct connection between the devices 2 or 3 or 4 and the device 6. In this case the devices 2 or 3 or 4 and 6 must be equipped with Bluetooth hardware dual mode and related developed and installed software. The installed software will enable them to mutually communicate and interact through the previously registered identification code, by identifying services and features. This is a closed type system, i.e. each device only recognizes the device associated with it.

Thanks to this solution, any pressure variation in the braking system the sensor located in devices 2 or 3 or 4 detects, is processed by the preinstalled software in the Bluetooth hardware present in devices 2 or 3 or 4. Then, it shall be communicated to the Bluetooth hardware in the device 6, during steps 11 and 12, thereby determining the beacon's switching on or off.

Figure 3:
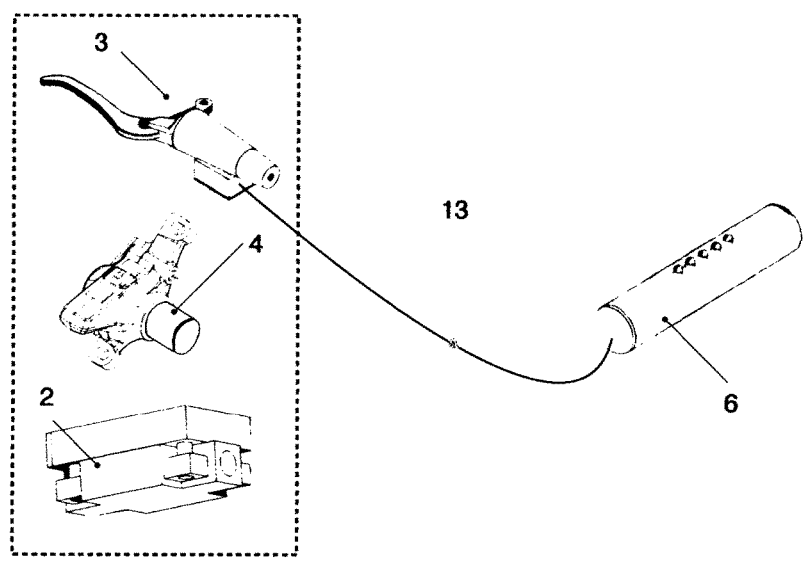
Figure 4:
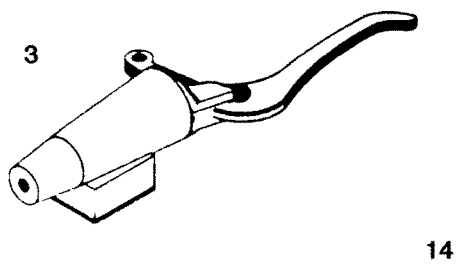
Figure 5:
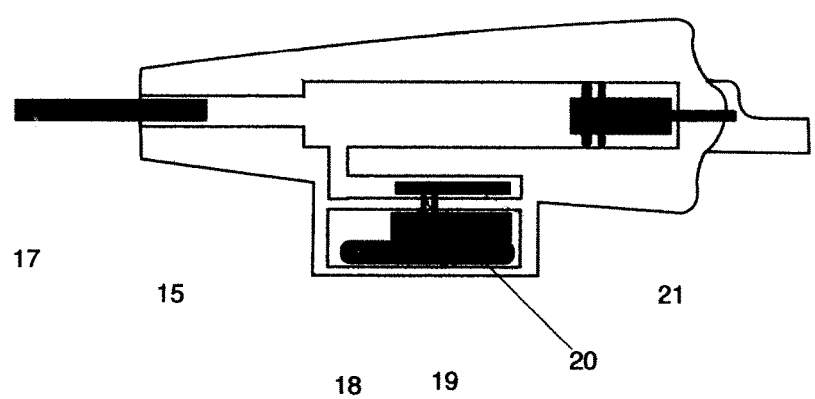
Figure 6:
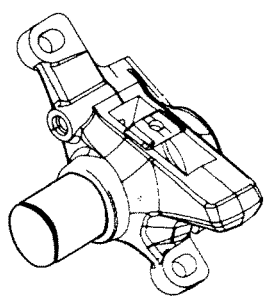
Figure 7:
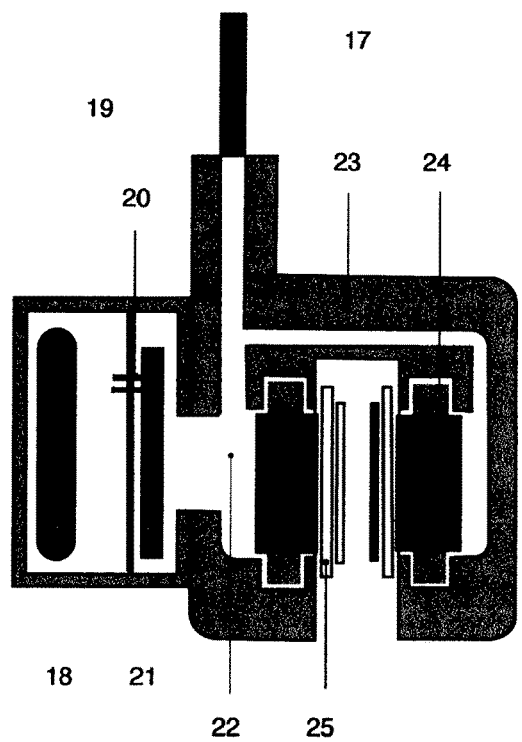
Figure 8:
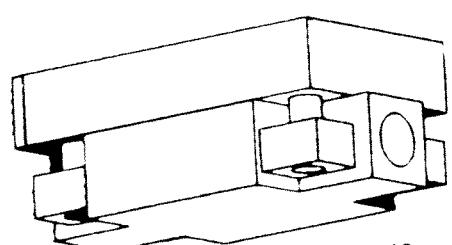
Figure 9:
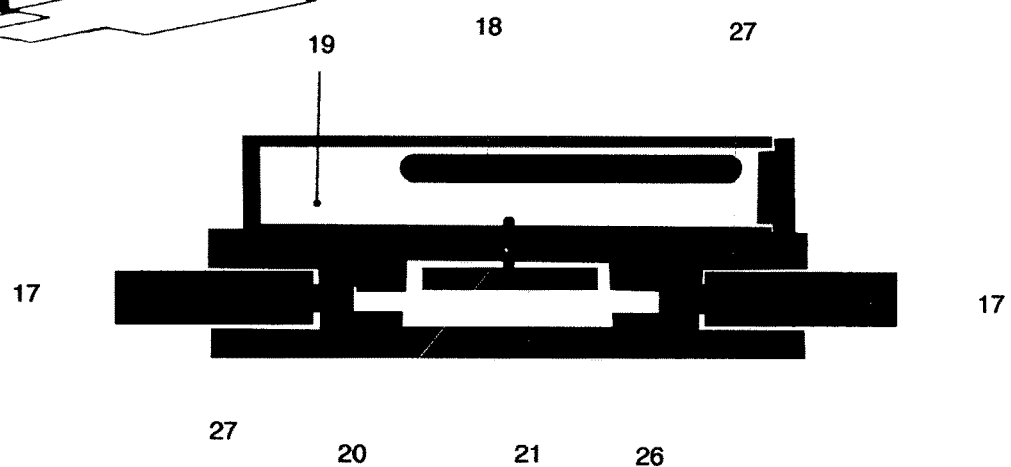
Figure 10:
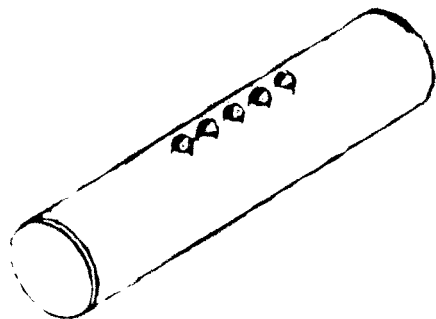
Figure 11:
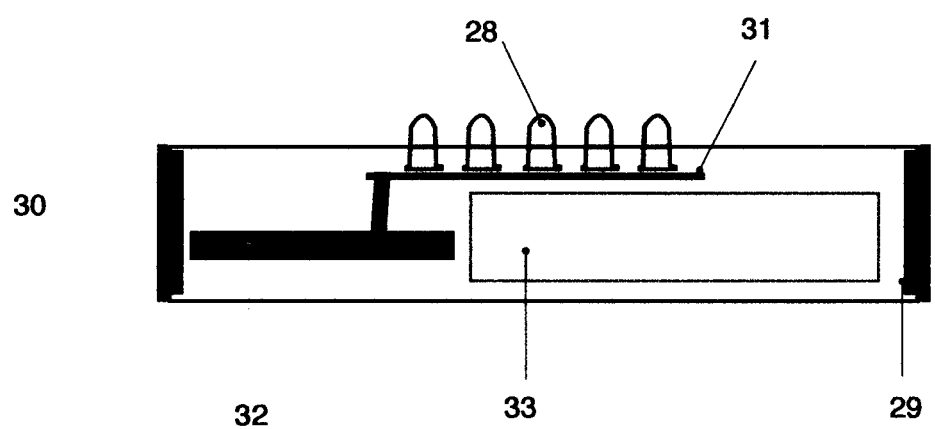

FIG. 3 shows a SSF operation diagram in the absence of external devices 1 and through a connection via electrical cable 13 between one of the devices 2, 3, or 4 and device 6. The device 2 or 3 or 4 are equipped with Bluetooth hardware, while the device 6 has no hardware at all. With this solution, every pressure variation in the braking system detected by the sensor devices located in devices 2 or 3 or 4 is processed and managed independently by pre-installed software in the Bluetooth hardware present in the device and transmitted via the electrical cable 13 to the device 6 for the consequent light brake signalling. FIG. 4 shows a control handlebar grip for hydraulic brakes mounted on handlebar, previously defined as device 3. FIG. 5 displays the longitudinal section of the FIG. 4 and shows the compression chamber containing the fluid 14, the metal body 15, the compression piston 16, the fluid conveying pipe 17, the Li-ion battery 18, the Bluetooth hardware 19, the electrical contacts 20 and the pressure sensor 21. FIG. 6 shows one type of caliper, previously defined as device 4, located on the rear and/or front wheel hub apt to lock the braking disc. FIG. 7 displays FIG. 6 longitudinal section, and shows the compression chamber 22, the metal body 23, the fluid-conveying pipe 17, the Li-ion battery 18, the Bluetooth hardware 19, the electrical contacts 20, the pressure sensor 21, the pads thrust piston 24 and the brake pads 25. FIG. 8 shows the detecting pressure box, previously defined as device 4, installed along the fluid-conveying pipe 17 from the control handlebar grip to caliper mounted on rear/front wheel. FIG. 9 displays the longitudinal section of the FIG. 8 and shows the fluid compression chamber 26, the fluid-conveying pipe 17, the Li-ion batteries 18, the Bluetooth hardware 19, the electrical contacts 20, the pressure sensor 21 and the metal body 27. FIG. 10 features the slowing and braking-signalling beacon, as previously defined as device 6. FIG. 11 displays the longitudinal section of FIG. 10 and indicates the Bluetooth hardware 32, the Li-ion battery 33, the led connection circuit 31, leds 28, the metal body 29 and the electrical contacts 30. The SSF operating principle is based on the detection of any pressure change within the main hydraulic circuit. In case of braking, i.e. by performing the braking action on the control handlebar grip, it causes a change in pressure via piston 16 within the hydraulic circuit, detected by the pressure sensor 21. This sensor is mounted in such a position and condition so as to detect any change in pressure within the hydraulic circuit and the compression chamber, in the devices 2 or 3 or 4. The transmission of the pressure change detected to the Bluetooth hardware 19, may occur either in a digital or analog fashion. The Bluetooth hardware 19, in turn, transfers the data consistently with the installed SSF configuration (FIG. 1 or FIG. 2 or FIG. 3). The data transfer activates the device 6, and in case of braking it will turn it on the beacon with a gradual intensity which will be proportionate to the pressure exerted on the handlebar brake grip.

The invention claimed is:
1. A bicycle equipped with a hydraulic brake system and a braking signalling system including detection means (2;3; 4), which comprises
   first radio communication means (19) based on Bluetooth Low Energy technology, and a light indicator (6) characterized in that
   a pressure sensor (21) is coupled with the hydraulic braking system to detect variations in pressure within said hydraulic braking system; and the light indicator (6) is designed to produce a light signal in response to a variation in pressure detected by the pressure sensor (21);

wherein the light indicator (6) is equipped with second radio communication means (32) based on Bluetooth Low Energy technology, to transmit and receive data; and designed to turn on, adjust intensity of the produced light signal and turn off in response to, and on the basis of, data received by the second radio communication means (32) and indicative of a variation in pressure detected by the pressure sensor (21); and wherein the system further includes a control device equipped with third radio communication means based on Bluetooth technology, wherein said third radio communication means are designed to exchange data with the first (19) and second (32) radio communication means; and programmed to communicate, by means of the third radio communication means, with the detection means (2; 3; 4) and the light indicator (6) so as to recognize and identify said detection means (2;3;4) and said light indicator (6) on the basis of univocal identification codes, and turn the light indicator (6) on and off, and adjust intensity of the light signal produced by said light indicator (6) in response to, and on the basis of, data received from the detection means (2; 3; 4) and indicative of a variation in pressure detected by the pressure sensor (21).

2. The bicycle of claim 1 wherein the hydraulic braking system includes:

a brake lever group (3), which comprises
  a cylinder (15) that houses a braking fluid (14) and includes a compression chamber,
  a piston (16) movable within the compression chamber to compress the braking fluid (14), and a brake lever that is installed on handlebars of said bicycle/motorcycle and is hand operable to compress the braking fluid (14) within the compression chamber by means of the piston (16); and a brake clamp group (4), that is
  coupled with a front or rear wheel of said bicycle,
  connected to the brake lever group (3) through a braking fluid conduit (17), and
  configured to brake said front/rear wheel in response to an activation of the brake lever;
and wherein the pressure sensor (21) is a pressure sensor coupled with the hydraulic brake system in one of its components chosen among the cylinder (15), the compression chamber, the brake clamp group (4), the braking fluid conduit (17).

3. The bicycle according to claim 1, wherein the first radio communication means (19) is designed to transmit and receive data and to transmit data indicative of a variation in pressure detected by the pressure sensor (21).

4. The bicycle of claim 1, wherein the first radio communication means (19) and the pressure sensor (21) are integrated into one and the same electronic device.

* * * * *